United States Patent
Melancon et al.

(10) Patent No.: US 9,045,961 B2
(45) Date of Patent: Jun. 2, 2015

(54) BLOWOUT PREVENTER SEAL AND METHOD OF USING SAME

(75) Inventors: Jeffrey Thomas Melancon, Willis, TX (US); James Allen Douty, The Woodlands, TX (US)

(73) Assignee: National Oilwell Varco, L.P., Houston, TX (US)

( * ) Notice: Subject to any disclaimer, the term of this patent is extended or adjusted under 35 U.S.C. 154(b) by 780 days.

(21) Appl. No.: 13/018,217

(22) Filed: Jan. 31, 2011

(65) Prior Publication Data
US 2012/0193874 A1 Aug. 2, 2012

(51) Int. Cl.
| | |
|---|---|
| F16L 23/00 | (2006.01) |
| E21B 33/06 | (2006.01) |
| F16L 23/20 | (2006.01) |
| E21B 33/00 | (2006.01) |

(52) U.S. Cl.
CPC ............ *E21B 33/06* (2013.01); *E21B 2033/005* (2013.01); *F16L 23/20* (2013.01)

(58) Field of Classification Search
CPC ..... E21B 33/06; E21B 2033/005; F16L 23/20
USPC ......... 277/608, 609, 616, 626, 643, 627, 644, 277/648, 649, 650, 651
See application file for complete search history.

(56) References Cited

U.S. PATENT DOCUMENTS

| | | | |
|---|---|---|---|
| 1,454,187 A | 5/1923 | Poppe et al. | |
| 1,819,036 A | * | 8/1931 | Oberhuber .................... 285/363 |
| 2,075,947 A | 4/1937 | Kennedy | |
| 2,178,698 A | 11/1939 | Penick et al. | |
| 2,898,000 A | 8/1959 | Hanny | |
| 2,980,284 A | 4/1961 | Gill et al. | |
| 3,001,803 A | 9/1961 | Walts et al. | |
| 3,028,917 A | 4/1962 | Rhodes | |
| 3,477,867 A | 11/1969 | Hillier | |
| 3,479,063 A | * | 11/1969 | Raver ........................... 285/108 |
| 3,653,673 A | 4/1972 | Green | |
| 3,656,769 A | 4/1972 | Jelinek et al. | |
| 3,820,830 A | 6/1974 | Dryer | |
| 3,913,927 A | 10/1975 | Gordon | |
| 4,131,287 A | 12/1978 | Gunderson et al. | |

(Continued)

FOREIGN PATENT DOCUMENTS

| | | |
|---|---|---|
| GB | 2340570 | 2/2000 |
| WO | 9318331 | 9/1993 |

(Continued)

OTHER PUBLICATIONS

Oct. 17, 2012, PCT International Search Report from counterpart application PCT/US2012/020405, 5 pages.

(Continued)

*Primary Examiner* — Gilbert Lee
(74) *Attorney, Agent, or Firm* — JL Salazar Law Firm (57) ABSTRACT

A blowout preventer (BOP) seal and method are provided. The seal includes a tubular body comprising a plurality of segments that form a continuous loop. The tubular body has a plurality of inner projections extending from opposite sides of a first end thereof and a plurality of outer projections extending from opposite sides of a second end thereof. Each of the plurality of projections tapers away from the tubular body. A cross-sectional area along at least a portion of the plurality of segments is varied whereby the plurality of segments are selectively reinforced.

28 Claims, 9 Drawing Sheets

(56) References Cited

U.S. PATENT DOCUMENTS

| | | | |
|---|---|---|---|
| 4,323,256 A | 4/1982 | Miyagishima et al. | |
| 4,348,032 A | 9/1982 | Hanson et al. | |
| 4,353,560 A * | 10/1982 | Tohill | 277/328 |
| 4,369,977 A * | 1/1983 | Bishop et al. | 277/312 |
| 4,477,093 A * | 10/1984 | Adamek | 277/322 |
| 4,537,406 A * | 8/1985 | Hirasuna et al. | 277/314 |
| 4,647,002 A | 3/1987 | Crutchfield | |
| 4,655,284 A | 4/1987 | McIlvride | |
| 4,703,938 A | 11/1987 | Fox | |
| 4,997,193 A | 3/1991 | Czernik | |
| 5,025,708 A | 6/1991 | Smith et al. | |
| 5,064,164 A * | 11/1991 | Le | 251/1.1 |
| 5,087,056 A | 2/1992 | Baglin | |
| 5,431,417 A | 7/1995 | Dahlgren | |
| 5,466,018 A * | 11/1995 | Stobbart | 285/334.2 |
| 5,505,426 A | 4/1996 | Whitby et al. | |
| 5,529,284 A | 6/1996 | Berger et al. | |
| 5,575,452 A | 11/1996 | Whitby et al. | |
| 5,588,491 A | 12/1996 | Brugman et al. | |
| 5,662,171 A | 9/1997 | Brugman et al. | |
| 5,735,502 A * | 4/1998 | Levett et al. | 251/1.3 |
| 5,778,918 A | 7/1998 | McLelland | |
| 5,897,094 A | 4/1999 | Brugman et al. | |
| 5,907,653 A | 5/1999 | Burek et al. | |
| 5,975,484 A | 11/1999 | Brugman et al. | |
| 6,070,912 A | 6/2000 | Latham | |
| 6,173,770 B1 | 1/2001 | Morrill | |
| 6,322,087 B1 * | 11/2001 | Swensen et al. | 277/626 |
| 6,374,925 B1 | 4/2002 | Elkins et al. | |
| 6,510,895 B1 | 1/2003 | Koleilat et al. | |
| 6,612,584 B1 * | 9/2003 | Ferouz et al. | 277/609 |
| 6,857,634 B2 | 2/2005 | Araujo | |
| 6,905,125 B2 | 6/2005 | Shibata et al. | |
| 6,913,092 B2 | 7/2005 | Bourgoyne et al. | |
| 6,926,283 B2 | 8/2005 | Janoff et al. | |
| 7,044,430 B2 | 5/2006 | Brugman et al. | |
| 7,051,989 B2 | 5/2006 | Springett et al. | |
| 7,073,796 B2 * | 7/2006 | Tanioka et al. | 277/626 |
| 7,125,055 B2 | 10/2006 | Dallas | |
| 7,140,618 B2 * | 11/2006 | Valls, Jr. | 277/609 |
| 7,159,652 B2 | 1/2007 | McGuire et al. | |
| 7,195,224 B2 | 3/2007 | Le | |
| 7,216,872 B1 | 5/2007 | Shaw et al. | |
| 7,234,530 B2 | 6/2007 | Gass | |
| RE39,973 E * | 1/2008 | Spence et al. | 277/608 |
| 7,350,562 B2 | 4/2008 | McGuire et al. | |
| 7,357,187 B2 * | 4/2008 | Gass | 166/379 |
| 7,367,396 B2 | 5/2008 | Springett et al. | |
| 7,401,790 B2 | 7/2008 | Sadowski | |
| 7,445,047 B2 | 11/2008 | Gomez | |
| 7,448,454 B2 | 11/2008 | Bourgoyne et al. | |
| 7,475,721 B2 | 1/2009 | McGuire et al. | |
| 7,523,644 B2 | 4/2009 | Van Winkle | |
| 7,798,466 B2 | 9/2010 | Springett et al. | |
| 7,814,979 B2 | 10/2010 | Springett et al. | |
| 7,967,299 B2 | 6/2011 | McClanahan | |
| 8,096,585 B2 * | 1/2012 | Vitel et al. | 285/110 |
| 2001/0045709 A1 * | 11/2001 | Stobbart | 277/602 |
| 2004/0188949 A1 | 9/2004 | Foote et al. | |
| 2004/0258470 A1 | 12/2004 | Hemphill et al. | |
| 2005/0051362 A1 | 3/2005 | McGuire et al. | |
| 2005/0082829 A1 | 4/2005 | Dallas | |
| 2005/0242519 A1 | 11/2005 | Koleilat | |
| 2006/0076526 A1 | 4/2006 | McWhorter et al. | |
| 2006/0243451 A1 | 11/2006 | Hemphill et al. | |
| 2007/0051164 A1 | 3/2007 | Van Winkle | |
| 2007/0089887 A1 | 4/2007 | Gomez | |
| 2007/0102150 A1 | 5/2007 | McGuire et al. | |
| 2008/0142210 A1 | 6/2008 | McGuire et al. | |
| 2008/0265188 A1 | 10/2008 | Springett et al. | |
| 2009/0033111 A1 * | 2/2009 | Hupp | 294/64.1 |
| 2009/0056132 A1 | 3/2009 | Foote | |
| 2009/0151959 A1 | 6/2009 | Darnell et al. | |
| 2010/0243926 A1 | 9/2010 | Weir | |
| 2010/0319906 A1 | 12/2010 | Van Winkle | |
| 2011/0000670 A1 | 1/2011 | Springett et al. | |
| 2011/0012311 A1 | 1/2011 | McClanahan | |
| 2011/0226475 A1 | 9/2011 | Springett et al. | |
| 2012/0012339 A1 | 1/2012 | Weir | |
| 2012/0012340 A1 | 1/2012 | Ensley et al. | |
| 2012/0055677 A1 | 3/2012 | Boyd | |
| 2012/0120192 A1 | 5/2012 | Alregib et al. | |
| 2012/0120193 A1 | 5/2012 | Shimizu | |
| 2012/0193874 A1 | 8/2012 | Melancon et al. | |
| 2012/0227987 A1 | 9/2012 | Catriotta et al. | |
| 2013/0018217 A1 | 1/2013 | Santek et al. | |
| 2013/0264501 A1 * | 10/2013 | Jahnke | 251/1.1 |
| 2014/0062038 A1 * | 3/2014 | Wolf et al. | 277/648 |

FOREIGN PATENT DOCUMENTS

| | | |
|---|---|---|
| WO | 2012012192 | 1/2012 |
| WO | 2012012193 | 1/2012 |
| WO | 2012106061 | 8/2012 |
| WO | 2013002971 | 1/2013 |

OTHER PUBLICATIONS

International Preliminary Report on Patentability and Written Opinion for PCT/US2013/035990 dated Oct. 14, 2014, 7 pages.
International Preliminary Report on Patentability and Written Opinion for PCT/US2012/020105 dated Jul. 13, 2013, 6 pages.
International Preliminary Report on Patentability and Written Opinion for PCT/US2012/020405 dated Aug. 6, 2013, 7 pages.
International Search Report for PCT Patent Application No. PCT/US2012/020105 dated Oct. 17, 2012, 5 pages.
International Search Report for PCT Patent Application No. PCT/US2013/035990 dated Jun. 4, 2014, 5 pages.
Examination Report for Canadian Patent Application No. 2,825,374 dated Aug. 14, 2014, 2 pages.

* cited by examiner

BLOWOUT PREVENTER SEAL AND METHOD OF USING SAME

BACKGROUND OF THE INVENTION

1. Field of the Invention

The present invention relates generally to techniques for sealing. More specifically, the present invention relates to techniques for sealing devices, such as blowout preventers (BOPs).

2. Background of the Related Art

Oilfield operations are typically performed to locate and gather valuable downhole fluids. Oil rigs are positioned at wellsites and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. Tubing or pipes are typically positioned in the wellbore to enable the passage of subsurface fluids to the surface.

Leakage of subsurface fluids may pose a significant environmental threat if released from the wellbore. Equipment, such as blow out preventers (BOPs), are often positioned about the wellbore to form a seal about pipes and to prevent leakage of fluid as it is brought to the surface. BOPs may employ rams and/or ram blocks that seal the wellbore. Some examples of ram BOPs and/or ram blocks are provided in U.S. Pat. Nos. 4,647,002, 6,173,770, 5,025,708, 7,051,989, 5,575,452, 6,374,925, 20080265188, U.S. Pat. Nos. 5,735,502, 5,897,094, 7,234,530 and 2009/0056132. The BOPs may be provided with various devices to seal various portions of the BOP as described, for example, in U.S. Pat. Nos. 4,323,256, 4,703,938, 5,064,164, and 5,735,502. Seals have also been used in other applications as described, for example, in U.S. Pat. Nos. 4,131,287, 6,070,912, and 5,529,284.

Despite the development of sealing techniques, there remains a need to provide advanced techniques for sealing devices, such as BOPs. It may be desirable to provide techniques that more effectively seal, even under high pressure conditions. It may be further desirable to provide techniques that provide more effective sealing in applications under external and/or internal pressures. Preferably, such techniques involve one or more of the following, among others: ease of operation, simple design, adaptability to a variety of applications, redundant barriers, adaptability to various pressures, enhanced sealing, performance under harsh conditions, conformance to equipment shapes, increased capacity, etc. The present invention is directed to fulfilling these needs in the art.

SUMMARY OF THE INVENTION

In at least one aspect, the invention relates to a metal-to-metal seal. The seal has a tubular body comprising a plurality of segments that form a continuous loop. The tubular body has a plurality of inner projections extending from opposite sides of a first end thereof and a plurality of outer projections extending from opposite sides of a second end thereof. Each of the projections tapers away from the tubular body. A cross-sectional area along at least a portion of the segments is varied whereby the segments are selectively reinforced.

A first portion of the segments may be linear, and a second portion of the segments curved. A cross-sectional area of the at least one of the segments may increase to a midpoint thereof. A cross-sectional area of the at least one of the segments may decrease to a midpoint thereof.

The inner projections may define an inner barrier ring of the tubular body. The outer projections may define an outer barrier ring of the tubular body. The inner barrier ring may have a thickness greater than the outer barrier ring. The outer barrier ring may have a thickness greater than the inner barrier ring. The projections may have an inner angle. The inner angle of a portion of the projections may be greater than the inner angle of another portion of the projections. The projections may have an outer angle, the outer angle of a portion of the projections being greater than the outer angle of another portion of the projections. The tubular body may have a race-track, oval and/or polygonal shape.

In another aspect, the invention relates to a seal for a blowout preventer (BOP). The BOP has a first portion and a second portion. Each portion of the BOP has a channel with grooves therein. The seal has a tubular body comprising a plurality of segments that form a continuous loop. The tubular body has a plurality of inner projections extending from opposite sides of a first end thereof and a plurality of outer projections extending from opposite sides of a second end thereof. Each of the projections tapers away from the tubular body. A cross-sectional area along at least a portion of the segments is varied whereby the segments are selectively reinforced. The tubular body is positionable in the channels and the grooves of the first and second portions of the BOP whereby the BOP is sealed.

The projections may grippingly engage the BOP about the grooves. An inner angle of the projections may conform to a shoulder of the BOP. An outer angle of the projections may define a space between the projections and the BOP. The projections may be expandable into the space. The inner projections may define an inner barrier ring of the tubular body. The inner barrier may be a barrier to internal pressure. The outer projections may define an outer barrier ring of the tubular body. The outer barrier may be a barrier to external pressure.

In yet another aspect, the invention may relate to a method of sealing a blowout preventer (BOP). The BOP has a first portion and a second portion. Each portion has a channel with grooves therein. The method involves providing a metal-to-metal seal, positioning the tubular body in the channel of each portion of the BOP, and extending the projections into the grooves.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope, for the invention may admit to other equally effective embodiments. The figures are not necessarily to scale, and certain features and certain views of the figures may be shown exaggerated in scale or in schematic in the interest of clarity and conciseness.

DETAILED DESCRIPTION OF THE INVENTION

The description that follows includes exemplary apparatuses, methods, techniques, and instruction sequences that embody techniques of the present inventive subject matter. However, it is understood that the described embodiments may be practiced without these specific details.

Figure 1:
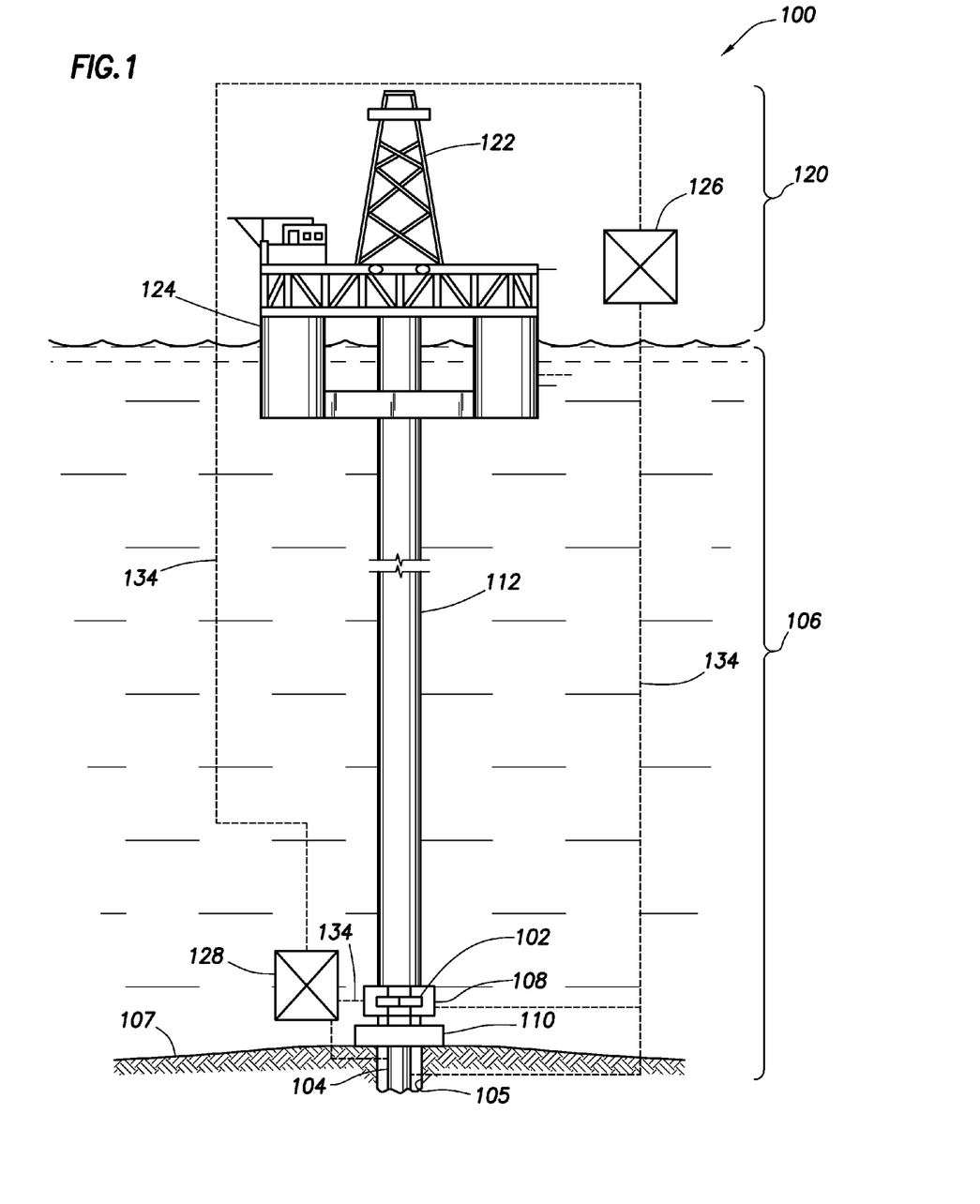
FIG. 1 is a schematic view of an offshore wellsite having a BOP with a BOP seal therein according to the invention.

FIG. 1 depicts an offshore wellsite 100 having a blowout preventer (BOP) 108 configured to seal a wellbore 105 extending into in a seabed 107. The BOP 108 has a BOP seal 102 positioned therein. As shown, the BOP 108 is part of a subsea system 106 positioned on the seabed 107. The subsea system 106 may also comprise a pipe (or tubular) 104 extending from the wellbore 105, a wellhead 110 about the wellbore 105, a conduit 112 extending from the wellbore 105 and other subsea devices, such as a stripper and a conveyance delivery system (not shown). While the wellsite 100 is depicted as a subsea operation, it will be appreciated that the wellsite 100 may be land or water based.

A surface system 120 may be used to facilitate operations at the offshore wellsite 100. The surface system 120 may comprise a rig 122, a platform 124 (or vessel) and a surface controller 126. Further, there may be one or more subsea controllers 128. While the surface controller 126 is shown as part of the surface system 120 at a surface location and the subsea controller 128 is shown part of the subsea system 106 in a subsea location, it will be appreciated that one or more controllers may be located at various locations to control the surface and/or subsea systems.

To operate the BOP 108 and/or other devices associated with the wellsite 100, the surface controller 126 and/or the subsea controller 128 may be placed in communication. The surface controller 126, the subsea controller 128, and/or any devices at the wellsite 100 may communicate via one or more communication links 134. The communication links 134 may be any suitable communication means, such as hydraulic lines, pneumatic lines, wiring, fiber optics, telemetry, acoustics, wireless communication, any combination thereof, and the like. The BOP 108 and/or other devices at the wellsite 100 may be automatically, manually and/or selectively operated via the controllers 126 and/or 128.

Figure 2:
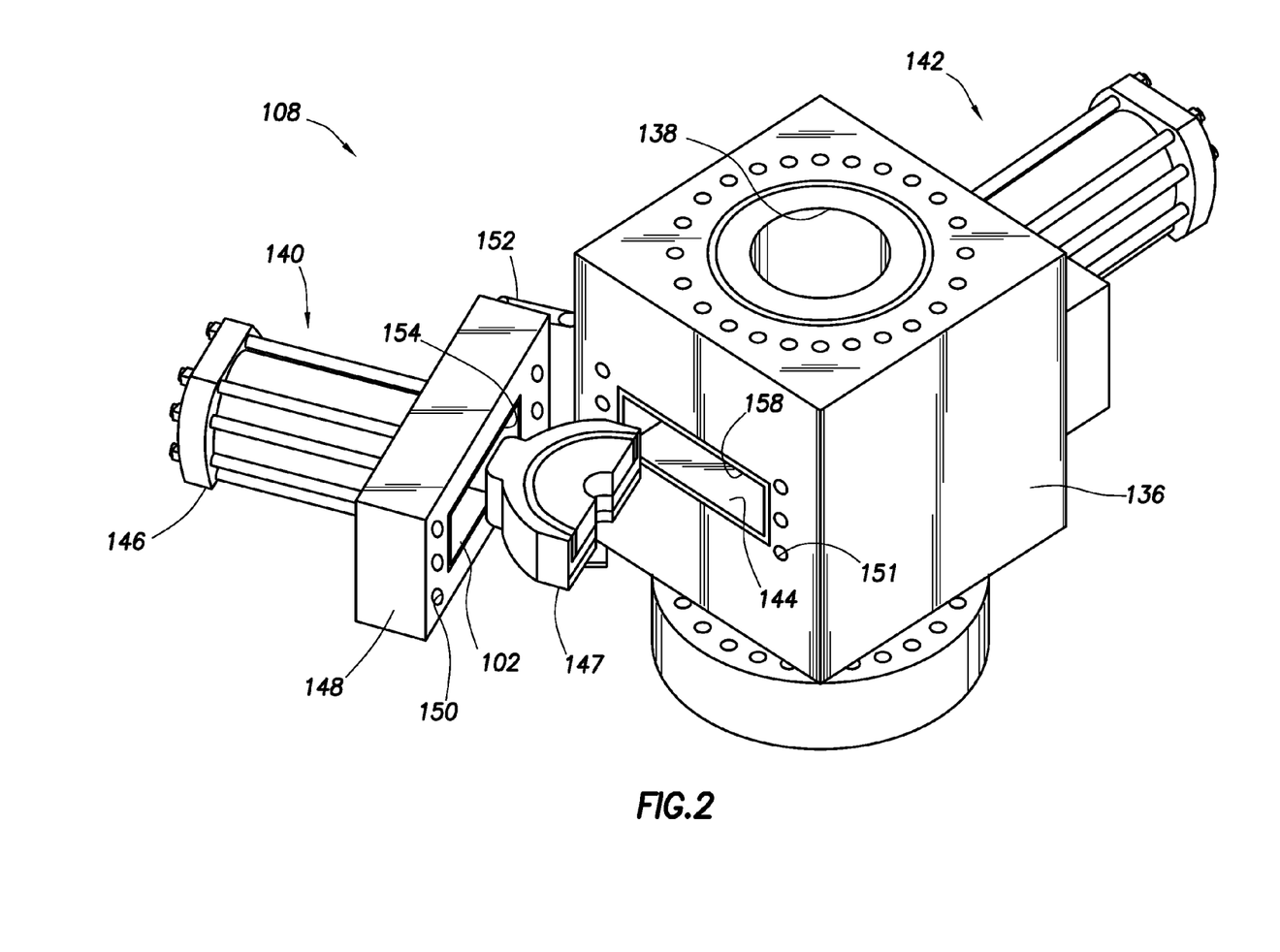
FIG. 2 is a schematic view of the BOP of FIG. 1 having a pair of ram block assemblies.

FIG. 2 shows a detailed, schematic view of a BOP 108 that may be used as the BOP 108 of FIG. 1. The BOP 108 may be a conventional BOP having a body 136 with a central passageway 138 therethrough for receiving a pipe (e.g., 104 of FIG. 1). The BOP 108 also includes a pair of conventional ram assemblies 140, 142 on opposite sides thereof. Examples of BOPs, ram assemblies and/or ram blocks usable with the BOP 108 are described in U.S. Pat. No. 5,735,502, the entire contents of which is hereby incorporated by reference. The ram assembly 140 has been pivotally retracted to reveal the BOP seal 102 therein. The BOP seal 102 is positionable in a BOP channel 158 in the BOP body 136 and a ram channel 154 in the ram door 148 for providing a seal therebetween.

Each ram assembly 140, 142 is in communication with a respective one of the radially opposing chambers 144 in the BOP body that extend radially outward from the central passageway 138. Each ram assembly 140, 142 may include a ram body 146, a ram block 147 and a ram door 148. Ram door 148 may be secured to the BOP body 136 by conventional bolts (not shown) which pass through respective apertures 150 in the door 148 and thread to corresponding ports 151 in the BOP body 136. Once in position, the ram block 147 may be selectively activated to move within the BOP 136 to a seal position about a pipe therein.

The ram assemblies 140, 142 may be pivotally mounted on the BOP body 136 by pivot arms 152, thereby facilitating repair and maintenance of the ram blocks 147. Bolts in the passageway 150 may thus be unthreaded from the BOP body 136, and the ram assembly 140 swung open, as shown in FIG. 2, to expose the ram block 147. When the door 148 is subsequently closed and the bolts retightened, the BOP seal 102 provides a static seal between a planar face of the BOP body 136 and the ram door 148.

Figure 3A:
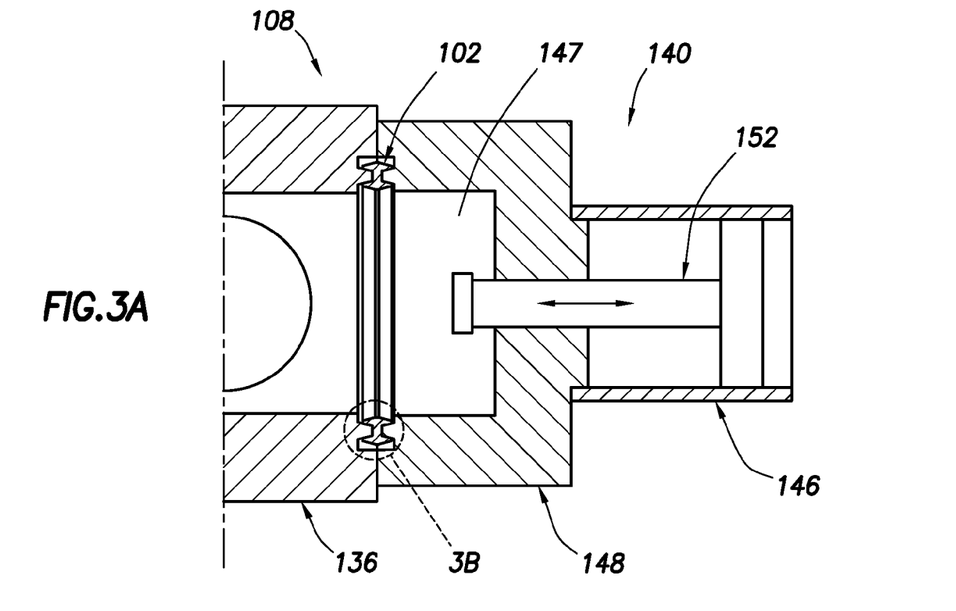
FIG. 3A is a cross-sectional view of a portion of the BOP of FIG. 2.

FIG. 3A shows a horizontal cross-sectional view of a portion of the BOP 108. This view of the BOP 108 shows ram assembly 140 in the closed position with the BOP seal 102 in sealing engagement with the BOP body 136 and the ram door 148. FIG. 3A also shows additional components of the ram assembly 140, such as the ram piston 152 slidably positioned in the ram body 146 for selectively translating the ram block 147.

Figure 3B:
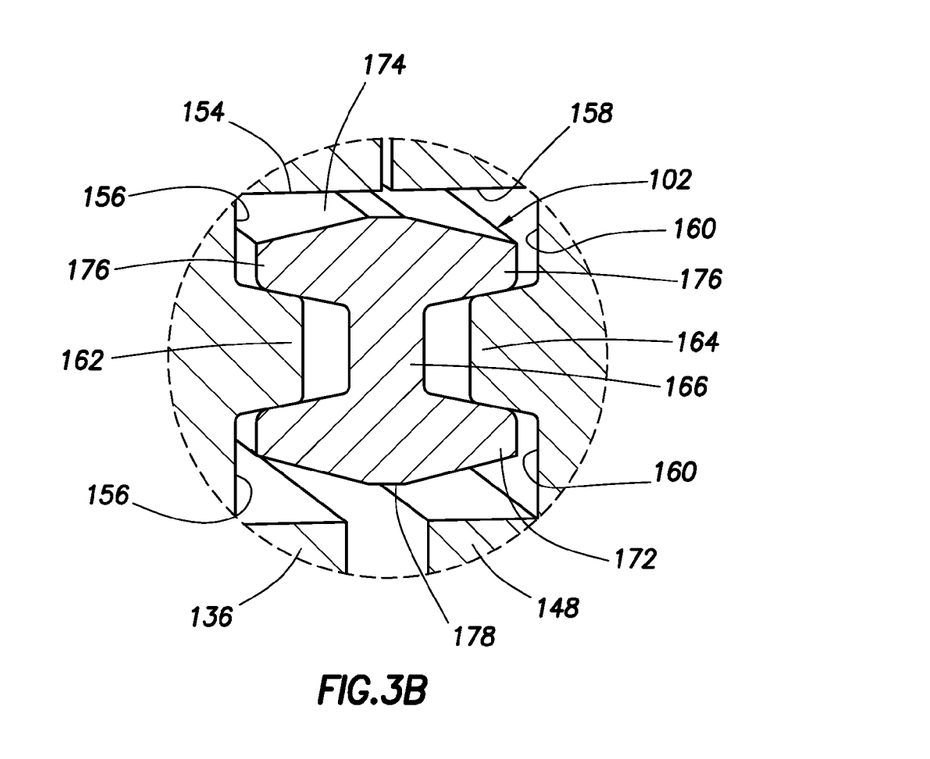
FIG. 3B is a detailed view of a portion 3B of the BOP of FIG. 3A, depicting a BOP seal.

FIG. 3B shows a detailed view of a portion 3B of the BOP 108 of FIG. 3A. As shown in this view, the BOP seal 102 is positioned in a BOP channel 154 with BOP grooves 156 extending into the BOP body 136, and a ram channel 158 with ram grooves 160 extending into the ram door 148. A BOP shoulder 162 is positioned between the BOP grooves 156. The BOP channel 154, BOP grooves 156 and BOP shoulder 162 are configured to receive the BOP seal 102 for providing sealing engagement between the BOP body 136 and the BOP seal 102. A ram shoulder 164 is positioned between the ram grooves 160. The ram channel 158, ram grooves 160 and BOP shoulder 164 are configured to receive the BOP seal 102 for providing sealing engagement between the BOP seal 102 and the ram door 148. Thus, the BOP seal 102 provides sealing engagement between the BOP body 136 and the ram door 148.

Figure 4A:
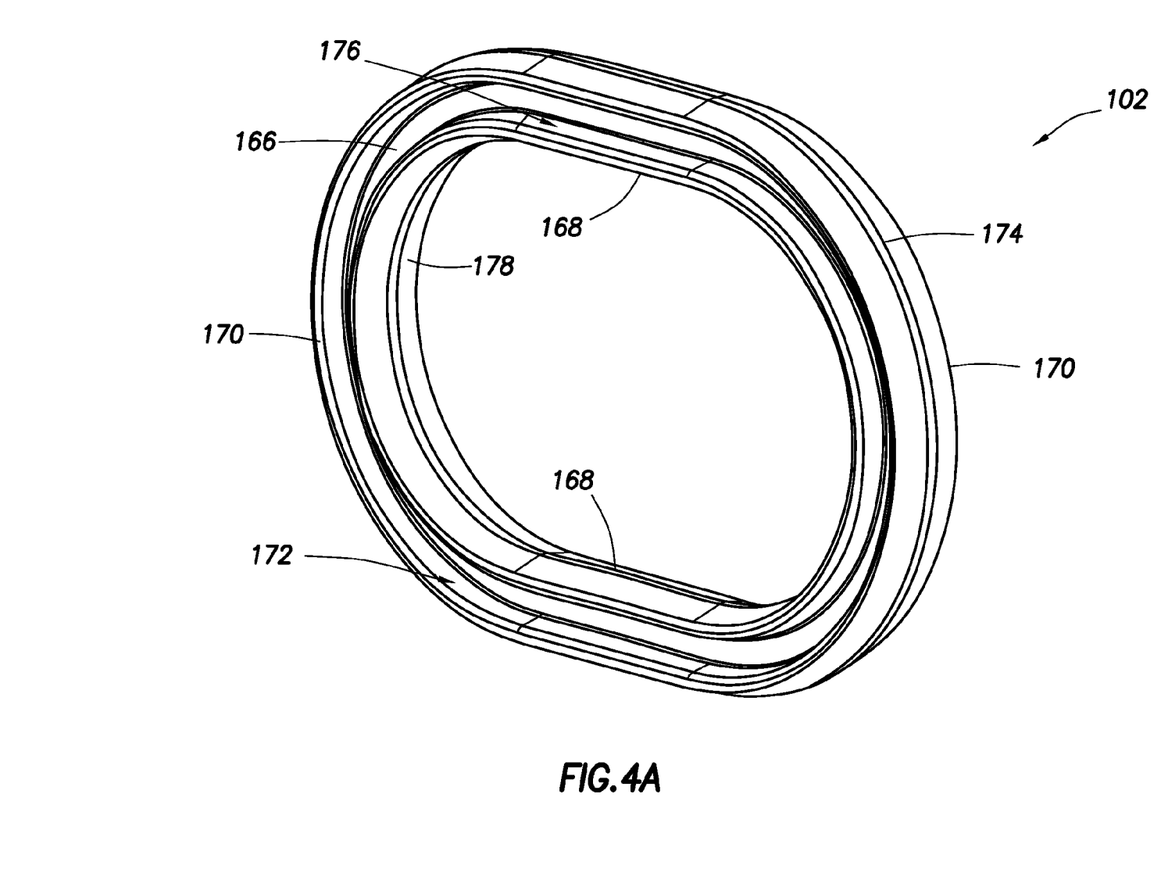
FIGS. 4A and 4B are schematic views of a BOP seal, depicted from alternate angles.
Figure 4B:
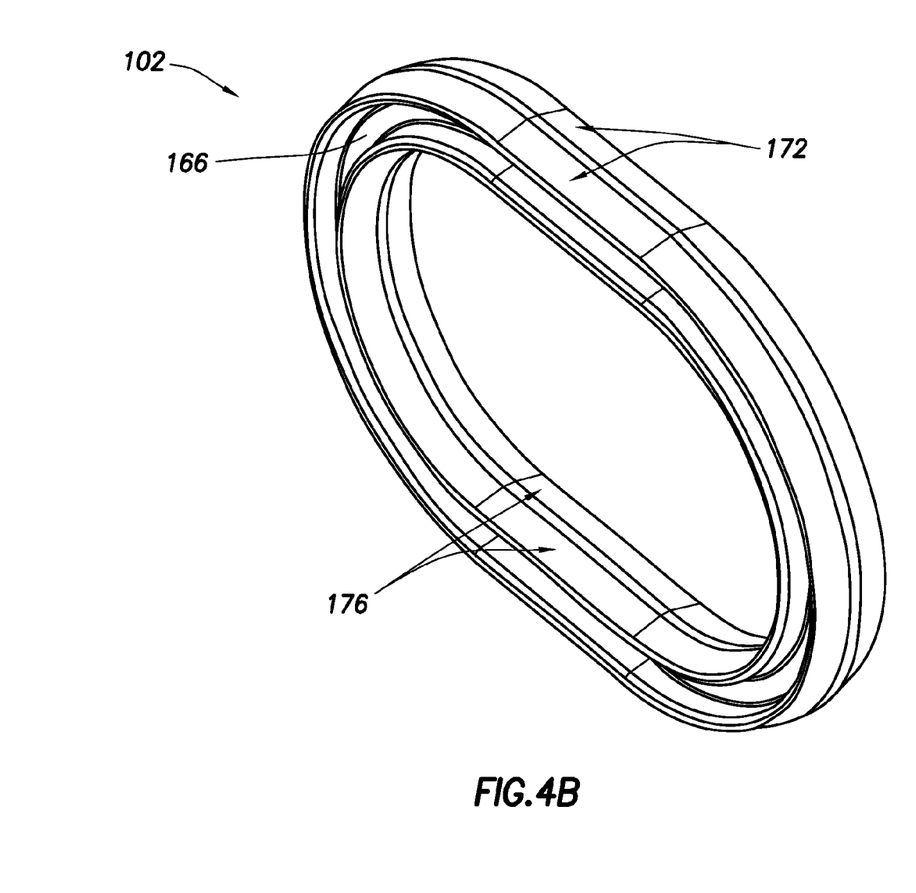

FIGS. 4A and 4B show alternative, schematic views of a BOP seal usable as the BOP seal 102 of FIGS. 1-3B. The BOP seal 102 is preferably a metal-to-metal seal made of, for example, a high strength nickel alloy (e.g., inconel) or other material sufficiently flexible to provide an effective seal during operation. The BOP seal 102 has a tubular body 166 with projections 172, 176 extending radially therefrom. The projections 172 and projections 176 extend from opposite sides of the tubular body 166. The projections 172 may be at a first end of the tubular body 166, and the projections 176 at a second end of the tubular body 166.

Figure 5:
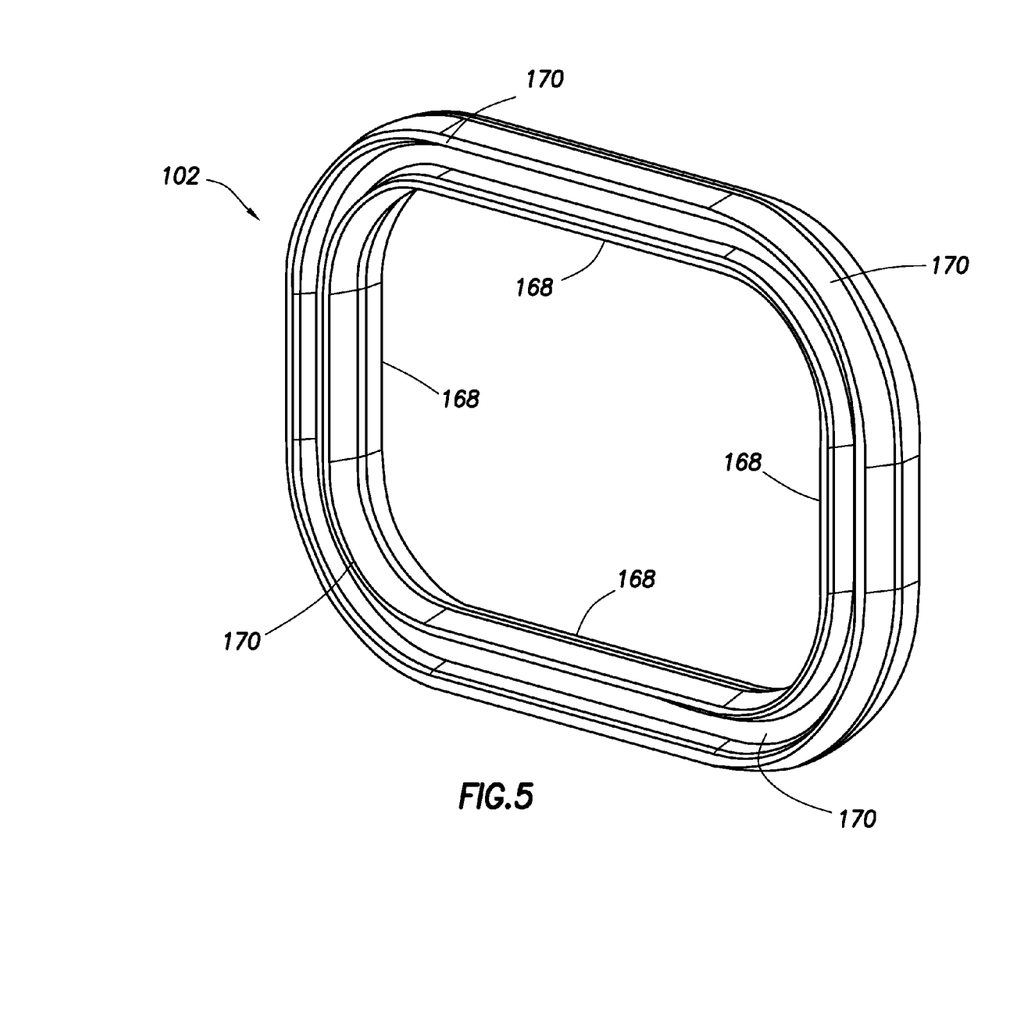
FIG. 5 is a schematic view of an alternate BOP seal.

The BOP seal 102 as shown is made up of a series of linear segments 168 and curved segments 170. The segments 168, 170 may be formed separately and joined together, or formed integrally as a single unit. While the figures depict a pair of linear segments 168 and a pair of curved segments 170, it will be appreciated that a variety of linear, curved, arcuate or other shapes may be combined to form the continuous loop as desired. The BOP seal 102 may form a variety of shapes, such as the race-track configuration of FIGS. 4A and 4B, or the rounded-rectangular configuration of FIG. 5. Other geometries, such as polygonal (e.g., rectangular, triangular, etc.) or other continuous shapes, may also be used as desired. As also shown in FIG. 5, the BOP seal 102 may also have any number of segments (e.g., 168, 170) to achieve the desired configuration.

Figure 6A:
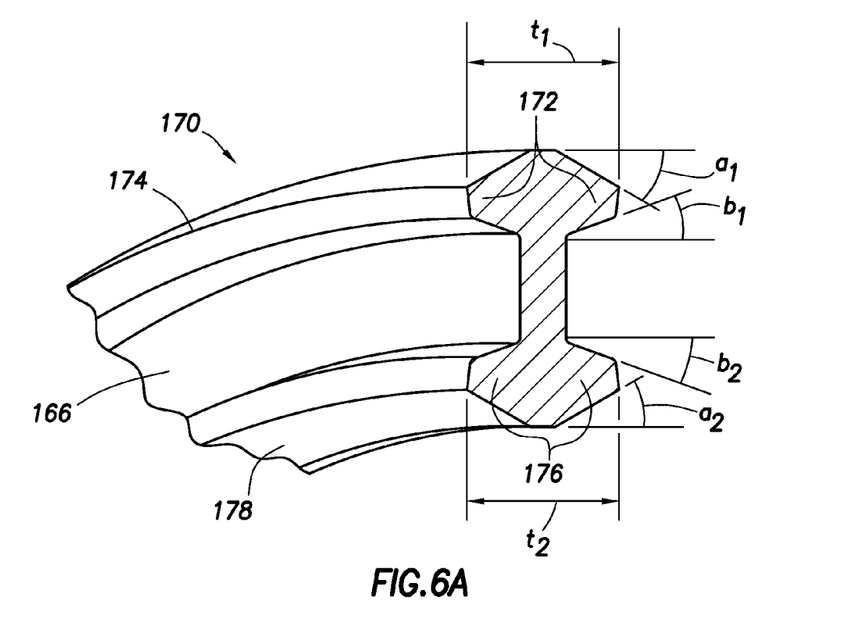
FIGS. 6A and 6B are schematic views of a portion of the BOP seal of FIG. 4A depicting a cross-section of a curved portion and a linear portion, respectively.
Figure 6B:
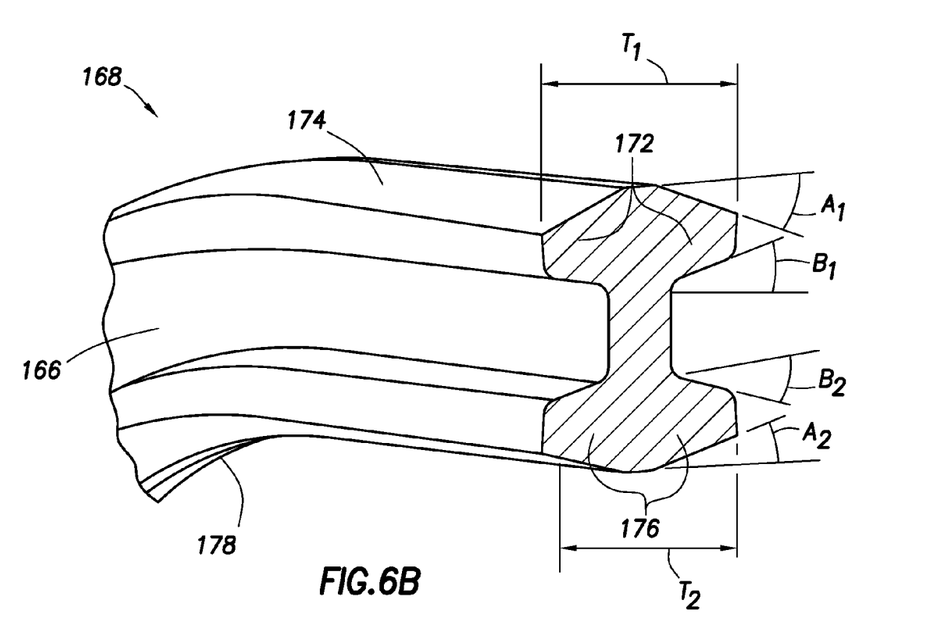

FIGS. 6A and 6B show cross-sectional views of the curved portion 170 and linear portion 168 of the BOP seal 102. As seen in FIGS. 6A and 6B (also shown in, e.g., FIGS. 3B, 4A-4B, 5, and 7A-7B), the BOP seal 102 has outer projections 172 that form an outer barrier ring (or barrier) 174, and inner projections 176 that form an inner barrier ring or barrier 178. As shown, the projections 172, 176 extend radially from the tubular ring 166 and taper away therefrom.

As also seen in FIGS. 6A and 6B, the cross-sectional area of the BOP seal 102 (shown with cross-section lines) may vary. The cross-sectional area of the curved portion 170 of FIG. 6A is depicted as having projections 172, 176 that have a thickness $t_1$ and $t_2$, respectively. The cross-sectional area of the linear portion 168 of FIG. 6B is depicted as having projections 172, 176 having a thickness $T_1$ and $T_2$, respectively. The projections 172, 176 of FIG. 6A define thinner outer and inner barrier rings 174, 178 with a thickness $t_{1,2}$ that is narrower than the thickness $T_{1,2}$ of FIG. 6B (e.g., $t_1 < T_1$, $t_2 < T_2$, etc.) In this configuration, the taper and the angle of the projections 172, 176 of FIG. 6A have also changed, thereby providing a different (or varied) cross-section from that of FIG. 6B. Also, the thickness of the projections 172 may vary from the thickness of the projections 176 (e.g., $t_1 > t_2$, $t_1 = t_2$, $T_1 < T_2$, etc.)

The tapered projections 172, 176 of the curved portion of FIG. 6A each have an inner taper surface at an inner angle $a_{1,2}$, respectively, and an inner taper surface at inner angle $b_{1,2}$, respectively, shaped to achieve the desired sealing capability. The tapered projections 172, 176 of the linear portion of FIG. 6B each have an outer taper surface at an outer angle $A_{1,2}$, respectively, and an inner taper surface at inner angle $B_{1,2}$, respectively, shaped to achieve the desired sealing capability. For clarity only one of the angles is depicted on each of the projections 172, 176 in each of FIGS. 6A and 6B. However, the projections on opposite side of the tubular portion 166 may also have a taper angle. The inner and outer angles on each of the projections may be the same or different depending on the desired configuration (e.g., a1>a2, a1=A2, a1<b1, and various other combinations, etc.)

Referring to FIGS. 3A-3B and 6A and 6B, the tapered angle(s) $a_{1,2}$, $b_{1,2}$, $A_{1,2}$, $B_{1,2}$ of the projections may be selected to achieve the desired sealing capability. For example, the shape of projections 172, 176 and/or inner angles $b_{1,2}$, $B_{1,2}$ may be selected to conform to and/or grippingly engage the shoulders 162 and/or 164. In another example, the shape of projections 172, 176 and/or angles $a_{1,2}$, $A_{1,2}$ may be selected to taper away from the channels 154, 58 and/or grooves 156, 160 to provide a space therebetween for expansion of the projections 172, 176 therein.

Figure 7A:
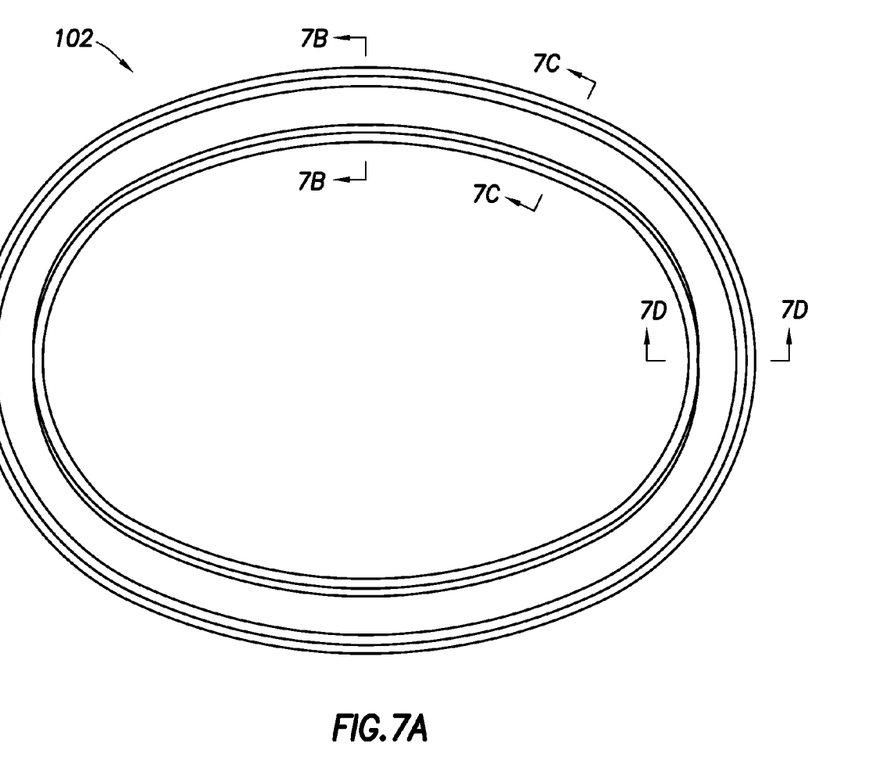
FIG. 7A is an alternate, schematic view of the BOP seal of FIG. 4A.
Figure 7B:
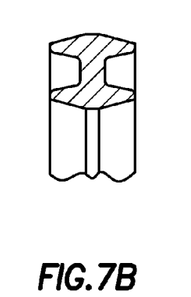
FIGS. 7B-7D show schematic, cross-sectional views of a portion of the BOP seal of FIG. 7A taken along lines 7B-7B, 7C-7C and 7D-7D, respectively.
Figure 7C:
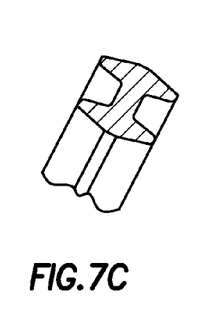
Figure 7D:
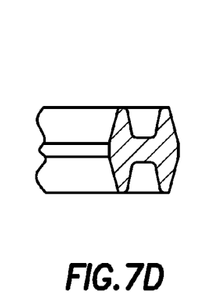

FIG. 7A shows another schematic view of the BOP seal 102. FIGS. 7B-7D show cross-sectional views of the BOP seal 102 taken along lines 7B-7B, 7C-7C and 7D-7D, respectively. These cross-sectional views show that the cross-sectional area of the BOP seal 102 varies at various locations along the BOP seal 102. For example, the cross-sectional area at 7D-7D in the curved portion is thinner than the cross-sectional area at 7B-7B. Portions of the BOP seal 102 may be provided with increased cross-sectional areas to provide reinforcement against high pressures and/or at weaker portions of the seal. The cross-sectional areas may taper between thicker, more linear portions, and thinner, more curved portion so that the portions mate at adjacent ends (e.g., at 7C-7C). It may be desirable to provide thicker cross-sections in areas of the BOP seal 102 having a larger radius (e.g., at 7B-7B) and a thinner cross-section in areas of the BOP seal 102 having a smaller radius (e.g., at 7D-7D) with a medium thickness therebetween (e.g., at 7C-7C).

Referring to FIGS. 4A-4B and 7A-7D, various portions of the BOP seal 102 may be provided with more or less reinforcement. In a given example, a seal 102 may have a linear segment 168 with a thicker cross-section (e.g., 7B-7B) at a midpoint thereof that tapers to a medium cross-section (e.g., at 7C-7C) at an intersection with a curved segment 170, and a curved segment 170 with a thinner cross-section (e.g., 7D-7D) at a midpoint thereof that tapers to the medium cross-section (e.g., 7C-7C).

As shown in FIGS. 3A-3B, 4A-4B and 7A-7D, the varied cross-sectional areas of the BOP seal 102 may be used to selectively conform the BOP seal 102 to the BOP body 136 and/or ram door 148. As shown in these Figures, the projections 172, 176 are smaller than the channels 154, 158 and grooves 160, 162. The projections 172, 176 are shaped to expand as pressure is applied and they are pressed against the shoulders 162, 164, thereby affecting a seal.

The shape of the BOP seal 102 may also be designed to engage the shoulders 162, 164 for sealing engagement therewith. The projections 172 and 176 on either side of the tubular body 166 may define contact surfaces for engaging the shoulders. The shape, length, angle and spacing of the projections 172, 176 are preferably configured to encourage contact with shoulders 162, 164 for enhanced sealing engagement as shown in FIG. 3B.

In operation, the outer barrier ring 174 may be used to seal against external pressures. The inner barrier ring 178 may be used to seal against internal pressures. These outer and inner barrier rings 174, 178 defined by the projections 172, 176 may be used to provide redundant barriers to fluid flow, thereby providing a 'double seal.' The tapered shape of the projections 172, 176 may be shaped to allow the BOP seal 102 to flex when energized to affect a proper seal. The flexibility may also be used to prevent wear.

The BOP seal 102 cooperatively engages the BOP along the channels 154, 158 and grooves 156, 160 therein. The projections 172, 176 are wedged outward and inward around the curved (or higher radius) sections of the channel and grooves, thereby expanding the geometry of the BOP seal 102 along the curves. As the BOP seal 102 is expanded in both directions, the geometry of the curved portion supports itself, thereby keeping the sealing surface of the BOP seal 102 tight along the grooves. However, the more linear (or lower radius) sections of the channels 154, 158 do not have the same geometry to support the BOP seal 102. The more linear portions (e.g., 168) of the BOP seal 102 may be provided with a thicker cross-sectional area (see, e.g., FIGS. 6A and 6B) to increase the tension the BOP places on the BOP seal 102 (e.g., where the BOP seal 102 contacts the shoulders 162, 164), thereby increasing the effectiveness of the linear portions. This reinforcement may be, for example, to provide support in the linear portions that is relatively equivalent to that of the curved portions.

Figure 8:
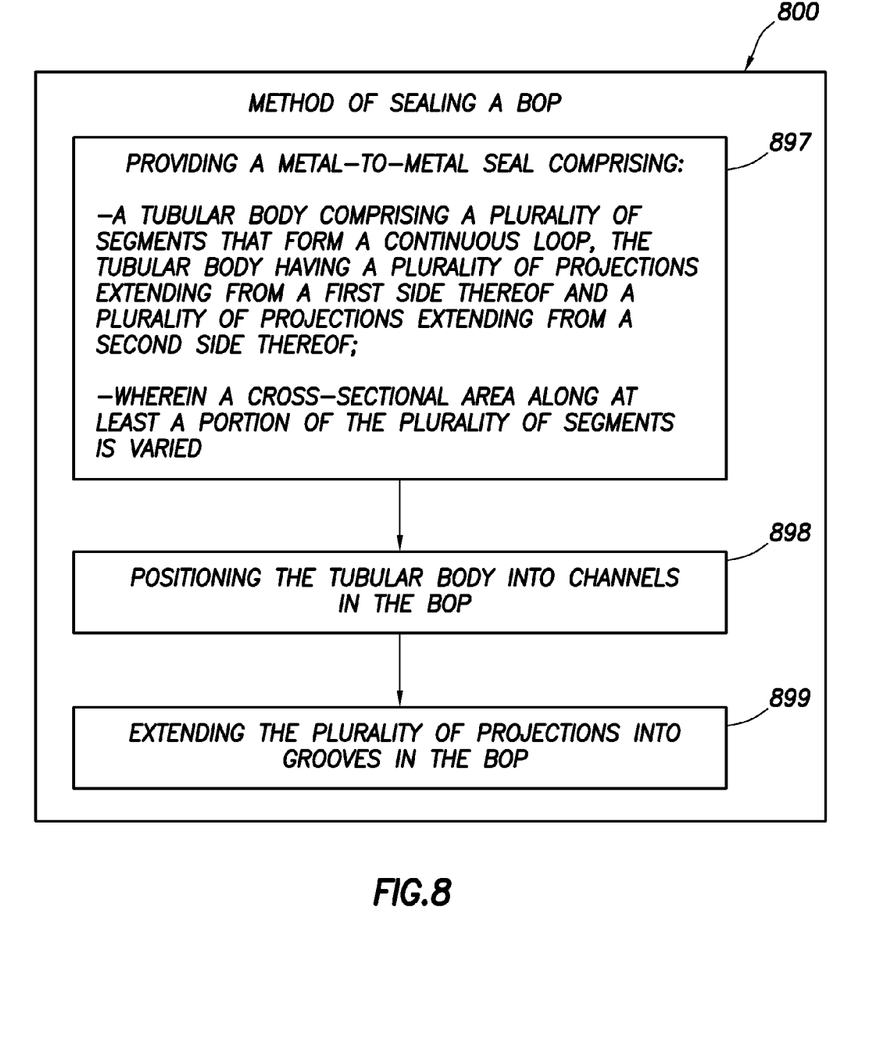
FIG. 8 is a flow chart of a method of sealing a BOP.

FIG. 8 is a flowchart depicting a method 800 of sealing a BOP, such as the BOP of FIG. 1. The method involves providing (897) a metal-to-metal seal, comprising a tubular body comprising a plurality of segments that form a continuous loop, the tubular body having a plurality of projections extending from a first side thereof and a plurality of projections extending from a second side thereof, each of the plurality of projections tapering away from the tubular body. A cross-sectional area along at least a portion of the plurality of segments is varied whereby the plurality of segments are selectively reinforced. The method further involves positioning (898) the tubular body in the channel of each portion of the BOP, and extending (899) the plurality of projections into the grooves.

In an example operation, the BOP seal 102 may be inserted into the BOP channel 158 with the projections 172, 176 extending into grooves 156 therein, and the ram door 148 may be positioned adjacent to the BOP body 136 with the BOP seal 102 inserted into the ram channel 158 and grooves 160 therein to form the seal therebetween. Additional steps may also be performed.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the present disclosure describes specific aspects of the invention, numerous modifications and variations will become apparent to those skilled in the art after studying the disclosure, including use of equivalent functional and/or structural substitutes for elements described herein. For example, aspects of the invention can also be implemented in various devices having channels for receiving the seal (e.g., BOP seal 102) and/or additional rings (e.g., similar to outer barrier ring 174, inner barrier ring 178) may be provided for further redundancy. All such similar variations apparent to those skilled in the art are deemed to be within the scope of the invention as defined by the appended claims.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A metal-to-metal seal, comprising:
    a tubular body comprising a plurality of segments that form a continuous loop, a first portion of the plurality of segments being linear and a second portion of the plurality of segments being curved, the tubular body having a plurality of projections comprising a plurality of inner projections extending from opposite sides of a first end thereof and a plurality of outer projections extending from opposite sides of a second end thereof, each of the plurality of projections tapering away from the tubular body, the outer projections having an inner taper surface at an inner angle tapering away from the inner projections and an outer taper surface at an outer angle tapering towards the inner projections;
    wherein a cross-sectional area of the tubular body at a location along the first portion of the plurality of segments is different from a cross-sectional area of the tubular body at another location along the second portion of the plurality of segments whereby the plurality of segments are selectively reinforced.

2. The metal-to-metal seal of claim 1, wherein the cross-sectional area of the plurality of segments increases to a midpoint thereof.

3. The metal-to-metal seal of claim 1, wherein the cross-sectional area of the plurality of segments decreases to a midpoint thereof.

4. The metal-to-metal seal of claim 1, wherein the plurality of inner projections define an inner barrier ring of the tubular body.

5. The metal-to-metal seal of claim 4, wherein the plurality of outer projections define an outer barrier ring of the tubular body.

6. The metal-to-metal seal of claim 5, wherein the inner barrier ring has a thickness greater than the outer barrier ring.

7. The metal-to-metal seal of claim 5, wherein the outer barrier ring has a thickness greater than the inner barrier ring.

8. The metal-to-metal seal of claim 1, wherein of the plurality of projections have an inner angle, the inner angle of a portion of the plurality of projections being greater than the inner angle of another portion of the plurality of projections.

9. The metal-to-metal seal of claim 1, wherein of the plurality of projections have an outer angle, the outer angle of a portion of the plurality of projections being greater than the outer angle of another portion of the plurality of projections.

10. The metal-to-metal seal of claim 1, wherein the tubular body has a race-track shape.

11. The metal-to-metal seal of claim 1, wherein the tubular body has an oval shape.

12. The metal-to-metal seal of claim 1, wherein the tubular body has a polygonal shape.

13. The seal of claim 1, wherein the tubular body has an inner barrier ring and an outer barrier ring with a body portion therebetween.

14. The seal of claim 1, wherein a seal pocket is defined between the plurality of inner projections and the plurality of outer projections.

15. The seal of claim 14, wherein the seal pocket is shaped to receive a shoulder of the blowout preventer.

16. A seal for a blowout preventer, the blowout preventer having a first portion and a second portion, each of the first and second portions having a channel with grooves therein, the seal comprising:
    a tubular body comprising a plurality of segments that form a continuous loop, a first portion of the plurality of segments being linear and a second portion of the plurality of segments being curved, the tubular body having a plurality of projections comprising a plurality of inner projections extending from opposite sides of a first end thereof and a plurality of outer projections extending from opposite sides of a second end thereof, each of the plurality of projections tapering away from the tubular body, the outer projections having an inner taper surface at an inner angle tapering away from the inner projections and an outer taper surface at an outer angle tapering towards the inner projections;
    wherein a cross-sectional area of the tubular body at a location along the first portion of the plurality of segments is different from a cross-sectional area of the tubular body at another location along the second portion of the plurality of segments whereby the plurality of segments are selectively reinforced; and wherein the tubular body is positionable in the channels and the grooves of the first and second portions of the blowout preventer whereby the blowout preventer is sealed.

17. The seal of claim 16, wherein the plurality of projections grippingly engage the BOP about the grooves.

18. The seal of claim 16, wherein the inner angle of the plurality of inner projections conforms to a shoulder of the BOP.

19. The seal of claim 16, wherein an outer angle of the plurality of projections defines a space between the plurality of projections and the blowout preventer.

20. The seal of claim 19, wherein the plurality of projections are expandable into the space.

21. The seal of claim 16, wherein the inner projections define an inner barrier ring of the tubular body.

22. The seal of claim 21, wherein the inner barrier ring is a barrier to an internal pressure.

23. The seal of claim 21, wherein the outer projections define an outer barrier ring of the tubular body.

24. The seal of claim 23, wherein the outer barrier ring is a barrier to an external pressure.

25. The seal of claim 16, wherein a seal pocket is defined between the plurality of inner projections and the plurality of outer projections.

26. The seal of claim 25, wherein the seal pocket is shaped to receive a shoulder of the blowout preventer.

27. A method of sealing a blowout preventer, the blowout preventer having a first portion and a second portion, each portion having a channel with grooves therein, the method comprising:

providing a metal-to-metal seal, comprising:
    a tubular body comprising a plurality of segments that form a continuous loop, the tubular body having a plurality of inner projections extending from opposite sides of a first end thereof and a plurality of outer projections extending from opposite sides of a second end thereof, each of the plurality of projections tapering away from the tubular body, the outer projections having an inner taper surface at an inner angle tapering away from the inner projections and an outer taper surface at an outer angle tapering towards the inner projections;

wherein a cross-sectional area along at least a portion of the plurality of segments is varied whereby the plurality of segments are selectively reinforced; and positioning the tubular body in the channel of each portion of the blowout preventer; and extending the plurality of projections into the grooves.

28. The seal of claim 27, further comprising disposing a shoulder of the blowout preventer between the plurality of projections and forming a seal between the plurality of projections and the shoulder.

\* \* \* \* \*